(12) United States Patent
Zimmer et al.

(10) Patent No.: US 8,250,828 B2
(45) Date of Patent: Aug. 28, 2012

(54) ANCHOR WITH CEMENT CONTOUR

(76) Inventors: Günther Zimmer, Rheinau (DE);
Martin Zimmer, Rheinau (DE);
Rüdiger Walz, Neustetten (DE)

( * ) Notice: Subject to any disclaimer, the term of this patent is extended or adjusted under 35 U.S.C. 154(b) by 51 days.

(21) Appl. No.: 12/806,674

(22) Filed: Aug. 18, 2010

(65) Prior Publication Data

US 2011/0027037 A1  Feb. 3, 2011

Related U.S. Application Data

(63) Continuation-in-part of application No. PCT/DE2009/000241, filed on Feb. 23, 2009.

(30) Foreign Application Priority Data

Feb. 23, 2008 (DE) .......................... 10 2008 010 730

(51) Int. Cl.
*E04B 1/38* (2006.01)
*E04C 5/00* (2006.01)
(52) U.S. Cl. .............. 52/704; 52/699; 52/701; 411/82.3
(58) Field of Classification Search .............. 52/125.3, 52/125.4, 125.5, 704, 705, 701, 707, 711, 52/364, 698, 699; 411/82, 82.3, 32, 45, 46, 411/49; 405/259.4, 259.5
See application file for complete search history.

(56) References Cited

U.S. PATENT DOCUMENTS

| 3,042,156 | A  | * | 7/1962  | Rohe ........................... 52/787.12 |
| 4,428,705 | A  | * | 1/1984  | Gelhard ....................... 411/82.1 |
| 4,509,308 | A  | * | 4/1985  | Dettfurth et al. .............. 52/787.1 |
| 4,679,966 | A  | * | 7/1987  | Yacisin ........................ 405/259.6 |
| 7,413,367 | B2 | * | 8/2008  | Hawang ........................ 403/297 |
| 8,046,964 | B2 | * | 11/2011 | Zimmer et al. ................. 52/364 |
| 2005/0123372 | A1 | * | 6/2005 | Sato ............................... 411/32 |
| 2010/0115882 | A1 | * | 5/2010 | Seroiszka et al. ............. 52/787.1 |
| 2010/0287875 | A1 | * | 11/2010 | Zimmer et al. ................. 52/699 |
| 2011/0232223 | A1 | * | 9/2011  | Zimmer et al. ................. 52/699 |
| 2011/0232224 | A1 | * | 9/2011  | Zimmer et al. ................. 52/699 |

* cited by examiner

*Primary Examiner* — Brian Glessner
*Assistant Examiner* — Brian D Mattei
(74) *Attorney, Agent, or Firm* — Klaus J. Bach (57) ABSTRACT

In an anchor for use in a lightweight construction panel including a support core provided at opposite sides with upper and lower cover plates, wherein the anchor comprises a cylindrical body having a bottom and including a cement containment and a displacement body for moving, upon insertion of the displacement body, engagement elements of the cylindrical body outwardly and causing the cement to be released from the containment and be directed via passages provided by the anchor into areas next to the top and bottom plates of the lightweight construction panel, where the cement solidifies for firmly connecting the anchor to the lightweight construction panel.

9 Claims, 5 Drawing Sheets

ANCHOR WITH CEMENT CONTOUR

This is a continuation-in-part application of pending International patent application PCT/DE2009/000241 filed Feb. 23, 2009 and claiming the priority of German patent application 10 2008 010 730.1 filed Feb. 23, 2008.

BACKGROUND OF THE INVENTION

The invention resides in an anchor for use in connection with a lightweight construction panel which comprises an upper and a lower cover plate with a support core disposed therebetween. The anchor is a cylindrical body provided with a bottom, a displacement body and a cement containment. The cylindrical body includes at least two engagement elements which are spread apart by the insertion of the displacement body into the cylindrical body after introduction of the anchor into a bore in the lightweight construction panel. The engagement elements are spread apart at the backside of the upper cover plate. The cement container is disposed in a chamber in the cylindrical body which chamber is provided with several openings.

The lightweight construction panels which are often also called sandwich panels or honeycomb panels have, for furniture construction applications, generally rigid cover layers consisting of thin particle plates, medium or high-density fiber plates, plywood plates or hard fiber plates. The sandwich panels include as center layer or, respectively, support core for example polyurethane foam or polystyrol sheets. In honeycomb panels often corrugated web- or so-called expanded honeycomb sheets are used as center layers. Most lightweight construction panels have a raw density of less than 500 kg/m$^3$. If no fire-retarding aluminum foams or foamed glass is used the raw density is below 350 kg/m$^3$. In comparison, the raw density of a particle panel without cover sheets is about 600 to 750 kg/m$^3$.

If metal fittings are to be mounted to the lightweight construction panels for example by screws, it is generally problematic that the attachment means can find support only on the relatively thin upper cover layer or, respectively, cover plate.

To provide for a better connection, the not pre-published DE 10 2006 049 953 A1 discloses an anchor comprising at least two parts which are moved into one another during the installation of the anchor. An at least partially pot-shaped part in this case has the function of a cylinder whereas a pin-like part takes on the function of a piston. In the bottom area of the pot-shaped part a cement cartridge is disposed whose balloon-like enclosure breaks open upon insertion of the piston part into the cylinder part. The cement is thereby released and spreads out in the area of the lower cover plate of the lightweight panel.

It is the principal object of the present invention to provide a cement anchor for lightweight construction panels which is easy to install and is firmly, safely and durably retained in the lightweight construction panel.

SUMMARY OF THE INVENTION

In an anchor for use in a lightweight construction panel including a support core provided at opposite sides with upper and lower cover plates, wherein the anchor comprises a cylindrical body having a bottom and including a cement contaminant and a displacement body for moving, upon insertion of the displacement element, engagement elements of the cylindrical body outwardly and causing the cement to be released from the containment and be directed via passages provided by the anchor into areas next to the top and bottom plates of the lightweight construction panel, where the cement solidifies for firmly connecting the anchor to the lightweight construction panel.

The cement enclosure has top and bottom ends which open up during installation of the anchor: the cement enclosure is supported at least temporarily on a stop arranged at the bottom of the anchor. The stop extends upwardly beyond opening elements which are directed toward the bottom end of the cement enclosure. Before installation, a displacement body is disposed in the cylinder above the cement container in a force-form or material locking condition in a first position. The displacement body is provided at its front end with opening elements which are directed toward the topside of the cement containment. The displacement body reaches during forward movement while being inserted into the cylindrical body the top side of the cement containment thereby rupturing it and displacing part of the cement which flows against the forward movement of the displacement body to a second position in which support projections of the displacement body engage the cement containment. The displacement body, while overcoming the support force of the bottom stops upon further movement thereof toward the bottom, presses the cement containment into a third position and the bottom side of the cement container against opening elements provided there rupture the bottom end of the cement container so that the opening elements provide there open the bottom end of the cement containment. The displacement body then, after overcoming the support force of the support projection, ejects a further amount of cement through the bottom wall of the cement containment and discharge openings in the cylindrical body into the area adjacent the lower cover plate.

With the present invention, a so-called hydraulic cement anchor is presented which, in principle, is designed as a cylinder-piston unit. As available commercially, the cylinder of the anchor encloses a containment including a flowable cement. When the cement anchor is inserted into a bore of a lightweight construction panel and, there, the displacement body is moved into the cylinder body, the cement containment top is first pushed open by the displacement body. The displacement body entering the cement containment displaces the cement in a direction opposite the direction of movement of the displacement body and into the area below the upper cover plate. Upon further insertion, the displacement body pushes the cement containment so against the cylinder bottom that the cement containment ruptures at the bottom. The displacement piston then pushes the remaining cement through the openings of the lower cylinder area into area around the lower end of the anchor. During the advance of the displacement body, the still flowable cement is directed via bores or channels to areas where it is needed for engaging the anchor in the lightweight construction panel. After the telescope-like contraction of the cylinder body and the displacement body, the cement hardens and fixes the anchor reliably in the lightweight construction panel.

The anchor consists of a tough plastic. A screw can be turned into the anchor already during hardening of the cement.

The invention will become more readily apparent from the following description of exemplary embodiments thereof with reference to the accompanying drawings.

DESCRIPTION OF PARTICULAR EMBODIMENTS

Figure 1:
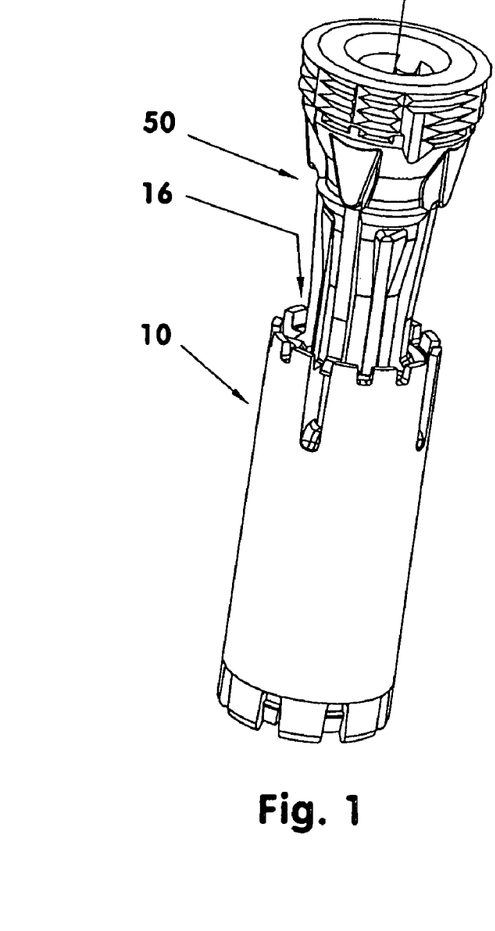
FIG. 1 is a perspective view of an anchor according to the invention in the form as it is commercially available shown at an angle from above.
Figure 2:
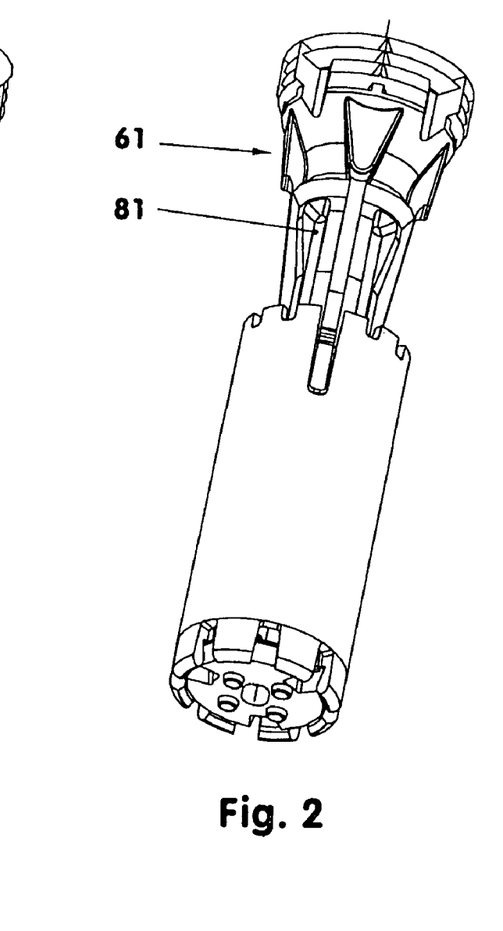
FIG. 2 shows the anchor at an angle from below.
Figure 3:
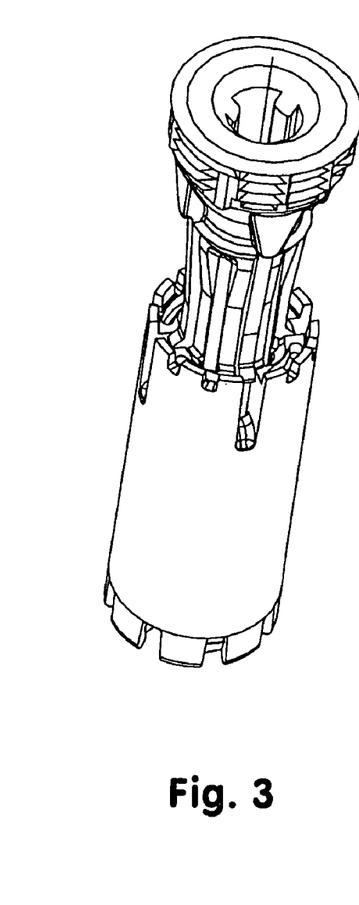
FIG. 3 shows the anchor at an angle from above.

The FIGS. 1-3 show an anchor in three view. The anchor is shown in the state as it is offered for sale. In this state, a displacement body 50 is partially inserted into an opening 16 in the cylindrical body 10 of the anchor. Between the displacement body 50 and the cylindrical body 10 a cement containment 40 which is a cement cartridge, see FIG. 11, is enclosed.

Figure 11:
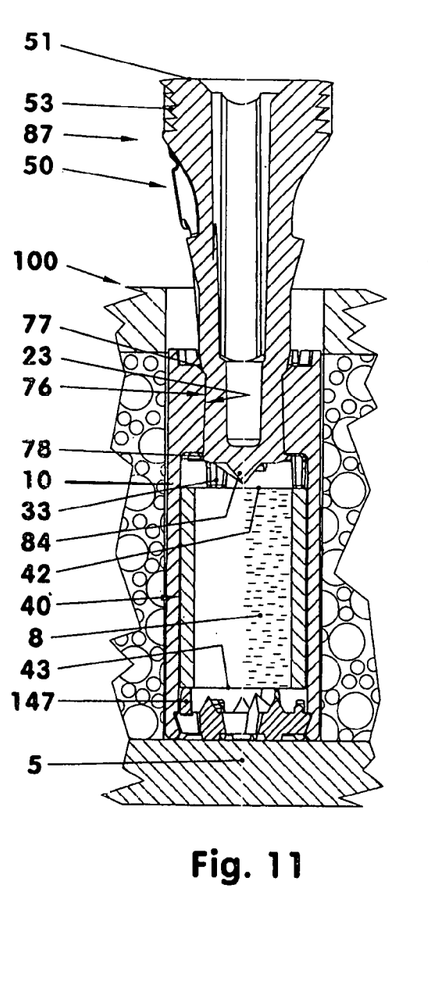
FIG. 11 is an axial cross-sectional view of the anchor as shown in FIG. 1.

FIG. 11 shows the anchor of FIGS. 1 to 3—slightly changed—in an axial cross-sectional view. The cylindrical body 10 is shown disposed within a lightweight construction panel without mounting structures such as or solid inserts.

Figure 16:
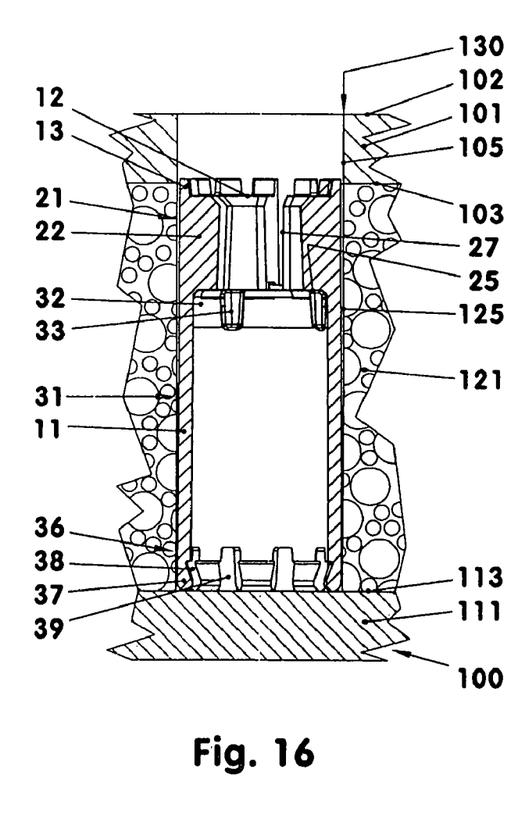
FIG. 16 is a longitudinal cross-sectional view of a bore in a lightweight construction panel with the anchor cylinder installed therein.

The lightweight construction panel 100 shown in FIG. 16 comprises two cover plates 101, 111 and an intermediate support core 121. Each cover plate 101, 111 consists in the shown embodiment of a thin particle board. The support core 121 is here for example a polyurethane (PU) foam core. The cover plates 101, 111 are glued with their inner surfaces 103, 113 to the plate-like support core 121. The lightweight construction panel shown in the figures has a wall thickness of 20 to 40 mm. Each cover plate has a thickness of for example 2 to 8 mm. Instead of the foam support core 121, also a honeycomb core may be provided. The lightweight construction panel 100 includes a bore 130, which has sections 105 and 125.

The lightweight construction panel may also be curved for example cylindrically or spherically if the material thickness of the support core 121 is at least approximately constant.

For mounting the cement anchor, a bore is drilled through the first cover plate 101 and at least into the support core 121. As drilling tool for example, a spiral drill is used which has a tip angle of 180°. It is also possible to use a spot facer. Depending on the anchor design, the bore 130 may also be made using a stepped spot facer. The cavity or bore 130 is then blown out by compressed air or evacuated.

The cylindrical body 10 is a pot-shaped component which consists of a tubular section 11 and a bottom 140. In the exemplary embodiment, the bottom 140 is tightly engaged in the tubular section 11.

Figure 4:
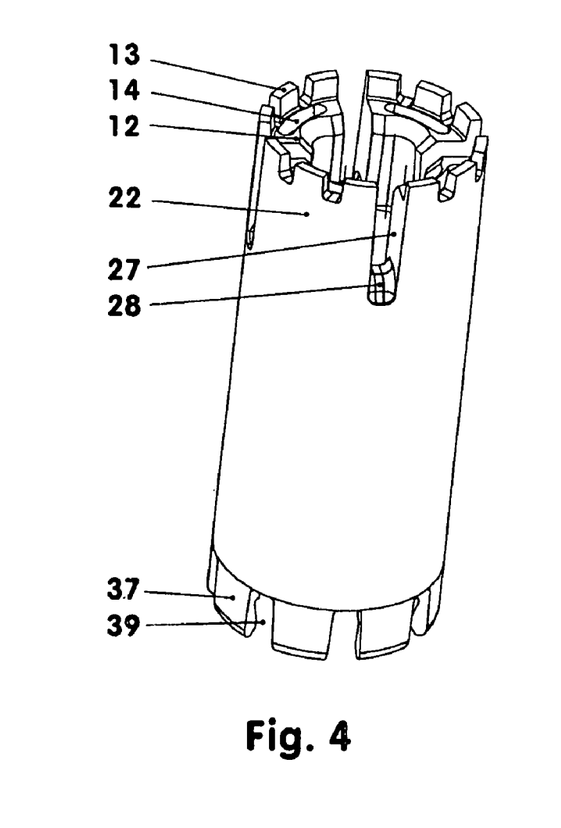
FIG. 4 is a perspective view of the anchor cylinder.
Figure 5:
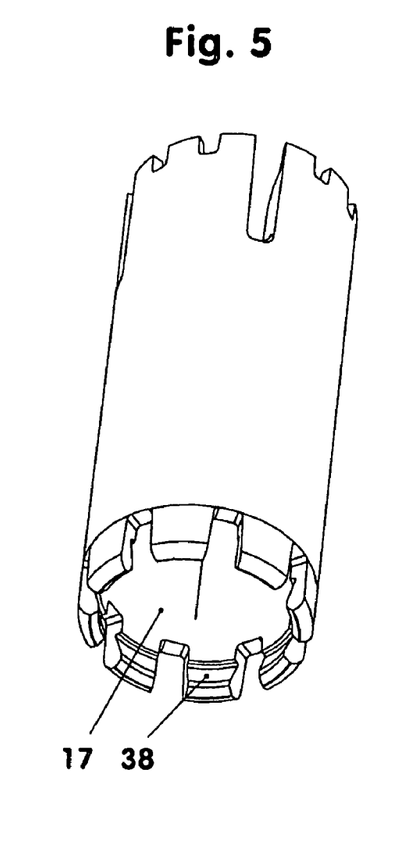
FIG. 5 is a perspective view of the anchor cylinder at an angle from below.

The tubular section 11 as shown in FIG. 16, which consists for example of the plastic material ABS, has an at least approximately cylindrical outer wall. It narrows down upwardly by a few tenths of a degree. The tubular section 11 comprises three large areas. The first area is the engagement area 21. In the exemplary embodiment, it is provided with four for example straight longitudinal slots 27, see FIGS. 4 and 5. The longitudinal slots 27 separate for example four engagement elements 22 of equal size.

Figure 6:
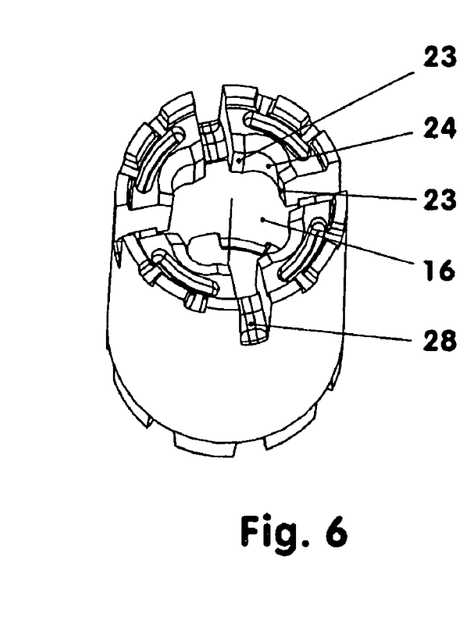
FIG. 6 is a perspective view of the anchor cylinder at an angle from above.

Each engagement element 22 comprises primarily a block of trapezoidal longitudinal cross-section, see FIG. 16, which block is connected to the second area 31 of the tubular section 11 by a narrow, thin-walled hinge zone 32. The inner wall of the individual engagement elements 22 includes two support surfaces 23 with a channel 24 disposed therebetween, see FIG. 6. The support surfaces 23 are partial surfaces of a truncated cone-like sleeve whose cone angle is about 4°. The theoretical tip of the cone is disposed, according to FIG. 16, far above the upper front face 12 of the tubular section 11. The mean diameter of the truncated cone-like sleeve in the area of the support surface 23 corresponds for example to half the maximum diameter of the outer wall of the tubular section 11.

The channels 24 disposed between the support surfaces 23 have a radius of curvature of about 1 mm. The depth of the channels 24 with respect to the theoretical truncated cone sleeve of the support surface 23 is for example 0.3 to 0.4 mm.

The engagement elements 22 are provided on their upper front faces 12 with a structure which includes upwardly projecting pinnacles 13 and recesses 14. The three pinnacles 13 provided on each engagement element 22 are flush with the outer wall of the engagement element 22. They have an average wall thickness of about 0.5 mm. Behind each center pinnacle 13 is a recess 14. The length of the recess 14 is about twice the length of the pinnacle 13. The recess 14 has the purpose to facilitate inward bending of the center pinnacle 13.

At the lower end of the individual longitudinal slots 27, an about 0.3 mm thick elastic seal tongue 28 is provided which is bent over by 90° so as to extend inwardly at least approximately horizontally by about 1 mm into the interior space 17.

Between the front face 12 and the support surface 23 and the channels 24, there is for example a 0.6×45° fase on which, as shown in FIG. 11, the displacement body 50 is supported with its blocking surface 77.

The second area 31 of the tubular section 11 is the cartridge support structure. This area 31 has an at least approximately cylindrical inner wall which becomes slightly wider toward the bottom end, see FIG. 16. The wall has there a wall thickness of for example 0.8 mm.

In the area of the hinge zone 32, four at least approximately paralleliped block-shaped stops 33 are provided which project about 0.5 mm inwardly from the inner wall of the tubular section 11. They are arranged between the longitudinal slots 27. At their lower edges, the cement containment 40 is disposed, see FIG. 11.

The third area 36 of the tubular section 11 is the bottom stop area. It comprises for example eight downwardly projecting elastic tongues 27, see also FIGS. 4 and 5, which are separated from one another by short longitudinal slots 39. On the inner wall of the tongues 37, that is, on the lower two thirds of the tongues, there is an inclined groove 38 cut into the tubular section 11 whose surface has the shape of a truncated cone sleeve. The truncated cone sleeve has a cone angle of 40°. The theoretical tip of the truncated cone sleeve is, with the anchor installed, disposed below the lower cover plate 111. The inclined groove 38 serves as a seat for the cylinder bottom 140, see FIGS. 11 to 15.

The cylinder bottom 140, which consists of ABS, is essentially a disc with a largely truncated cone-shaped outer wall 141. It has a central oval cavity 143. At its bottom side 155, it has four truncated cone-shaped legs 156 which are each about 0.4 mm long. At its top side 144, the bottom 140 has three large break-off pins 147, three kidney-shaped support legs 149, four pointed thorns 51 and two sharp-edged prisms 152.

The break-off pins 147 are disposed at the edge of the bottom 140. They are formed to extend from rectangular trapezoidal cavities 142 of the bottom 140 and are connected thereto by means of break off web 140. The break-off pins 147 project about 1.5 mm upwardly above the top side 144. The break-off webs 148 themselves have a wall thickness of 0.1 mm.

The three kidney-shaped support legs 149 are 0.5 mm high. They are disposed at the edge area of the bottom 140 between the break-off pins 147. The cone-shaped thorns 151 have a height of 1 mm and a tip angle of 60°. They are arranged in the corners of a square which surrounds the oval cavities 143. Adjacent the sides of the cavity 143, a sharp-edged prism 152 is arranged. The tip of each prism 152 is disposed about 1.2 mm above the top side 144.

The cement cartridge 40 is an essentially cylindrical tube 41, which, at its two flat end faces which extend normal to the center line 5 is sealed by a PE coated aluminum foil 42, 43. The tube 41 which consists of PE-HD, has for example an outer diameter of 8 mm and a wall thickness of for example 0.9 mm. It is filled with about 0.3 to 04 ml cement 8.

The cement 8 is for example a single-component cyanoacrylate cement, that is a so-called instant cement. For cementing the plastic anchor components to the lightweight construction panel 100 which is wood-based, the cement 8 is formulated for a good gap bridging and slow curing (>60 sec). It has a viscosity at 20° C. of 3000 to 14000 mPA. The cement (8, 9) for example solidifies for example without any volume increase.

The cement cartridge 40 is held engaged between the stops 33 of the tube section 11 and the break-off pins 147 of the bottom 140 with no or only little play in axial direction.

The displacement body 50 which is formed as a single piece from the plastic material ABS includes, at its outside, four relatively large zones, that is, an upper clamping zone 52, a wedging zone 61, a back flow zone 65 and a lower engagement zone 75. A central opening 85 extends through the upper three zones and ends in the lower engagement zone 75.

The upper clamping zone 52, which, after installation of the anchor is clamped in position in the bore 105 of the upper cover plate 101, has an at least approximately cylindrical shape. Its outer wall is highly structured. It has for example four circumferential grooves 54 disposed between five partially closed circumferential webs 53 which are intersected by for example twelve circumferentially equally spaced vertical clamping webs 55. Next to each third clamping web 55, there is a vertical groove 56 which extends through the two lower circumferential webs 53. The grooves 56 are deeper for example by about 30% than the circumferential grooves 53. The vertical grooves 56 end in the following wedging zone 61.

As shown in FIG. 11, the second to fifth circumferential webs 53 have a diameter which smaller, by 0.3 mm, then the upper, first circumferential web. The diameter of the first circumferential web is greater, by 0.8 mm, than the bore 105 in the lightweight construction panel. In addition, the first circumferential web is provided at the front surface 51 with a fase so that its outer edge is disposed lower than the plane of the front face 51 by about 0.15 mm.

In the area of the wedging zone 61, the displacement body 50 narrows down by about 44% of its outer diameter. The cone angle corresponds to 64°. On the frustroconical surface of the wedging zone 61, there are four wedging element 62 arranged equidistantly spaced around the circumference of the displacement body 50. The wedging elements 62 which narrow down toward the bottom have a planar surface 63 and are inclined with respect to the center line 5 by for example 6°, the bottom end tips of the wedging elements 62 having the smallest distance from the center line 5.

Figure 7:
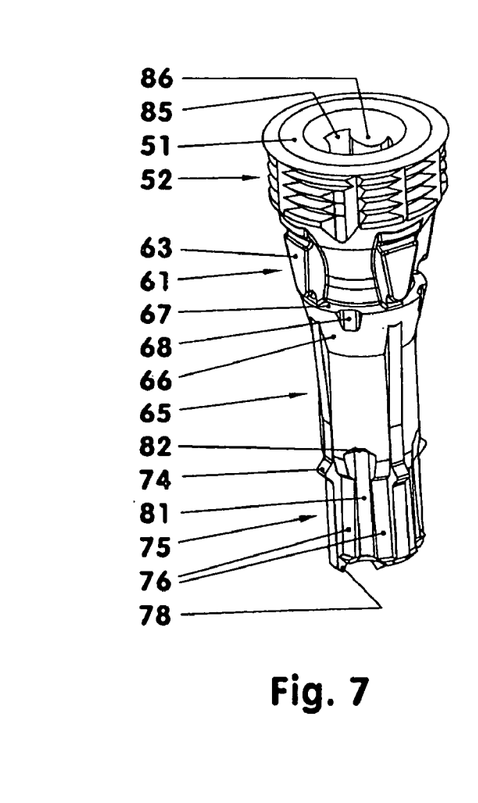
FIG. 7 is a perspective view of the displacement body at an angle from above.
Figure 8:
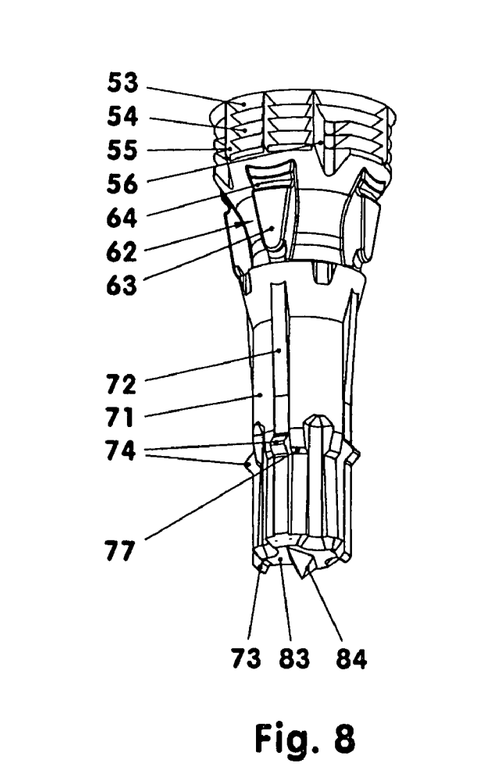
FIG. 8 is a perspective view of the displacement body at an angle from below.
Figure 9:
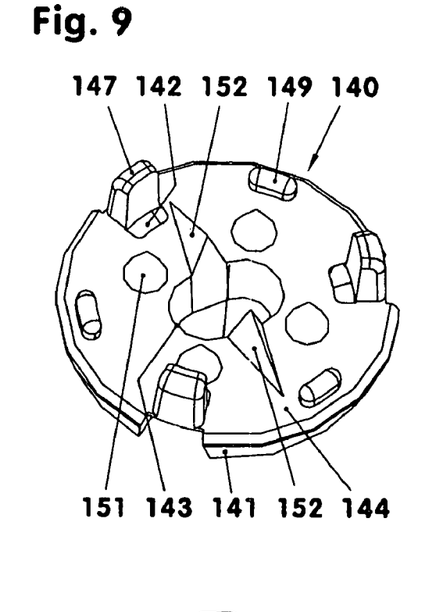
FIG. 9 shows, in a perspective view, the anchor bottom.

When the anchor is installed, the wedging elements 62 are disposed in the longitudinal slots 27 between the engagement elements 22 wherein the lower tips of the wedging elements 62 are disposed in the bottom area of the V-shaped expanded longitudinal slots 27. The side walls of the wedging elements 62 abut then the side walls of the engagement elements 22 so that they are rotationally fixed thereby. As shown in FIGS. 7 and 8, each surface 63 has additionally a horizontal groove 64 whose groove surface is in the form of the outer surface of a torus. The groove assists in the form-locking engagement of the cement 9 that has flowed below the upper cover plate 103 and has solidified there.

Below the wedging zone 61, there is the backflow zone 65. The center area of the backflow zone 65 is a cylinder section 71 where four rotation preventing webs 72 are arranged spaced equidistantly around the wedging body. The webs 72 start at the tips of the wedging elements 62 and end at the lower front end 82 of the displacement body 50 (see FIGS. 7, 8). In the area of the cylinder section 71, the outer wall of the individual rotation preventing webs 72 form a wedging surface which is inclined with respect to the centerline 5 by an angle of about 4°.

FIGS. 7 and 8 show arranged at the transition between the wedging zone 61 and the backflow zone 65, a frustroconical locking ring 66 whose upper area extends over the rotation preventing webs 72. The locking ring 66 has a cone angle of 30°. The theoretical tip of the frustroconical ring is disposed on the center line 5 in the area of the lower engagement zone 75. Toward the wedging elements 62, the locking ring 66 also has a frustroconical support surface 67. Its cone angle is for example 150° wherein the fictional cone tip is disposed in the wedging zone 61.

The locking ring 66 has four short channel-like cavities 68. During installation the stops 33 of the tubular section 11 are fitted therein.

The lowermost area of the displacement body 50 is the lower engagement zone 75. The rotation preventing webs 72 extend in this area further downwardly. They have there planar outer surfaces, which are parallel to the center line 5 and which extend partially below the lower front face 83 and end in sharp engagement tips 73. The outer surfaces disposed opposite one another have a distance which is slightly smaller than the inner diameter of the tube 41 of the cement material cartridge 40. At the transition between the return flow zone 65 and the lower engagement zone 75 each rotation preventing web 72 is provided with a radially outwardly extending support projection 74, see also FIGS. 12 and 13. Each support projection 74 has a front and a rear flank. The two flanks are arranged at an angle of 90°, whereas the plane of the front flank intersects the centerline 5 at an angle of 45°. The maximum distance of two support projections 74 arranged opposite each other is about 0.8 mm greater than the inner diameter of the tube 41, see FIG. 12.

Between the rotation preventing webs 72, the retaining surfaces 76 are arranged. Their outer surfaces are in the form of a frustroconical sleeve, which has a tip angle of for example 4° and whose fictional tip is above the upper front face 51 of the anchor. As shown in FIG. 11, the retaining surfaces 76 of the displacement body 50 are in contact with the support surfaces 23 of the cylindrical body 10. At the upper ends of the retaining surfaces 76 blocking surfaces 77 are arranged. They too are part of the frustroconical sleeve. It has here a tip angle of for example 90°, wherein the fictional tip is disposed in the area of the lower engagement zone 75.

At the lower end of the retaining surfaces 76, there are locking projections 78 which project radially outwardly by about 0.3 mm and which, as shown in FIG. 11, extend around the engagement surfaces 25 of the engagement elements 22.

In the center of each retaining surface 76, there is a reflux channel 81 formed into the retaining surface 76. Each of the four reflux channels 81 extends from the lower front face 83 to the lower area 82 of the backflow zone 65, see also the dashed representation of the reflux channels 81 in FIGS. 12 and 13. The base of the reflux channels 81 extends parallel to the centerline 5. In FIGS. 1 to 3, the reflux channels 81 end only shortly ahead of the wedging zone 61.

The lower front face 83 is provided with a pyramidal tip 84, see FIG. 8, for rupturing the upper cover foil 42. The base area of the tip 84 is rhombus-shaped and has a long diagonal which is 2.7 times the length of the short diagonal. The length of the long diagonal is 4.2 mm and the height of the pyramidal tip 84 is for example 1.1 mm.

In the upper front face 51, an at least partially truncated cone-shaped opening 85 is provided whose centerline coincides with the centerline 5, see FIG. 7, for accommodating a mounting element. The opening 85 has three or more radially inwardly extending webs 86 which end shortly ahead of the lower engagement zone 75. Between the front face 51 and the cavity 85, there is a 0.9×45° fase.

The opening 85 has in its upper area—disregarding the webs 86—for example, a diameter of 4.2 mm. The inner circle defined there between the webs 86 has a diameter of about 2 to 3 mm, wherein the webs 86 have, at their top, a width of about 2.5 mm. The front edges of the webs 86 which abut the inner circle extend also parallel to the centerline 5.

The mounting elements are for example particle board screws of sizes (in mm) 3.5×25 or 4×25.

Of course, the opening 85 may have another cross-section; it may for example be oval, polygonal, square, or star-shaped. It may also have the form of a short straight cone. In this case, the mounting element has to cut the largest part of the support bore itself.

In the exemplary embodiment the opening provides for guidance of the mounting element to avoid its deviation from the center line 5 when being screwed in. However, the bore may also be omitted or replaced by a dot mark.

For installation of the cement anchor in the bore 130 of the lightweight construction panel 100, the anchor is generally pressed in by a stroke. By the spreading apart of the engagement elements 22 and as a result of the form of the clamping zone 52, the anchor 8 can be sufficiently firmly and safely installed already before the cement 8 is cured.

Below, the fixing of the anchor is described referring to individual, separate steps, although this process is performed in a single continuous installation stroke. In the FIGS. 11 to 15, the cement 8, 9 or respectively, the cement flow is shown in each case only for the right hand figure side in order not to cover up too many details.

FIG. 11 shows an anchor in the state as it is commercially available wherein the anchor has been inserted, in a first step in the prepared bore 125 of the lightweight construction panel 100. The cylindrical body 10 is disposed on the inner surface 113 of the lower cover plate 111. The upper front face 12 of the cylindrical body 10 is disposed herein for example 0.5 mm below the inner surface 103 of the upper cover plate 101. In the cylindrical body 10, the still closed cement cartridge 40 is arranged. Above the cement cartridge 40, the displacement body 50 is disposed with its lower engagement zone 75 in the engagement area 21 of the cylindrical body in the first position 87. Its pyramidal tip 84 is not yet in contact with the cement cartridge 40.

Figure 12:
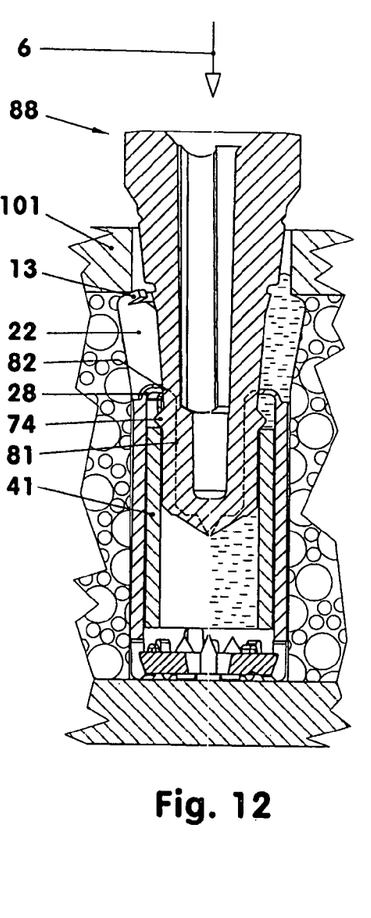
FIG. 12 is a view like FIG. 11 after a first insertion step of the displacement body.
Figure 13:
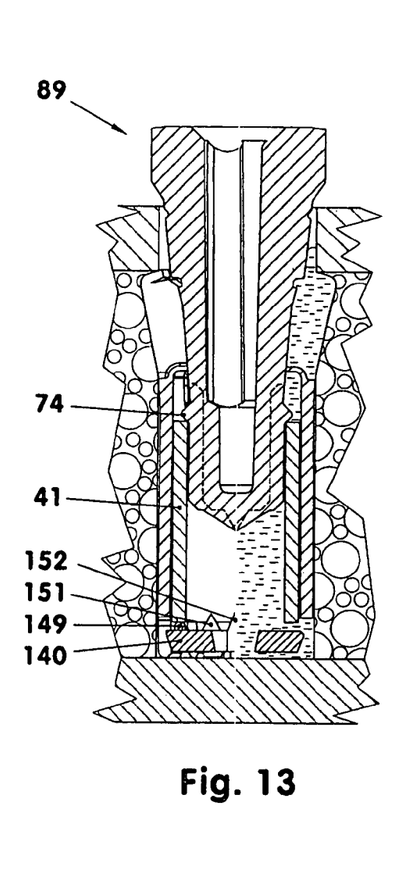
FIG. 13 is a view like FIG. 12 after a second insertion step of the displacement body.

In a second step, the displacement body 50 is inserted, by a forward movement 6, into the cylindrical body 10 until the support projections 74 abut the upper edge of the tube 41, see FIG. 12. The second position 88 of the displacement body 50 has then been reached. In the process, the tip 84 of the displacement body 50 has ripped the cover foil 42 of the cement cartridge 40 open. Also, the displacement body 50 which has entered the cement cartridge 40 has displaced about 40% of the flowable cements counter to the advance movement 6 via the reflux channels 81 upwardly. The still flowable cement 8 has at this point reached the upper cover plate 101. At the same time, the backflow zone 65 has partially spread the engagement elements 22 apart. In the process, the pinnacles 13 have started to collapse toward the front face 12 of the engagement elements 22.

Figure 10:
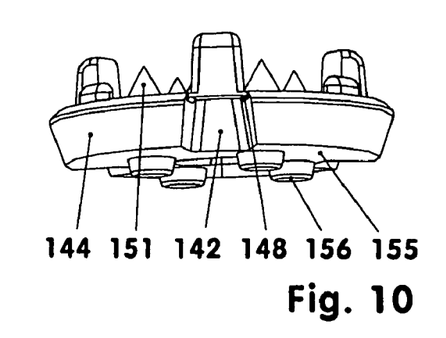
FIG. 10 shows the anchor body at an angle from below.

In a third step, the downwardly moving displacement body 50 presses the tube 41 onto the cylinder bottom 140 with such a high force that, there, the break-off pins 147 are ripped off at their break-off webs 148, see FIG. 10. The break-off pins 147 drop into the cavities 142. The displacement body 50 has now reached its third position 89. As the break-off pins yield, the lower cover foil 43 is pressed against the sharp-edged prisms 152, and the arms 151 while being ruptured. The tube 41 is now seated on the support legs 149, see FIG. 13.

During the further advance of the displacement body 50, the support projections 74 yield. They are sheared off or they slide along the inner wall of the tube 41, see FIG. 14. During this process, a part of the cement 8 is further displaced upwardly until the upper ends 82 of the reflux channel 81 reach the upper edge of the tube 41. The upper edges 82 of the reflux channels 81 act as control edges of a hydraulic valve. The gap between the tube 41 and the wall of the backflow zone 65 prevents a backflow of the cement 8 which is still liquid. The cement volume to be pressed upwardly can be controlled as desired by the length of the reflux channels 81.

Then the remaining amount of cement 8 is further displaced only through the openings in the lower area of the cylindrical body 10 or, respectively, the bottom into the area in front of the lower cover plate 111.

Figure 14:
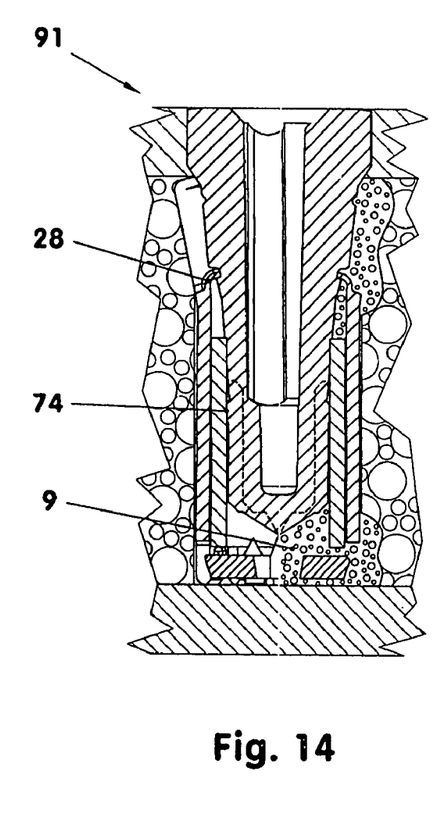
FIG. 14 is a view like FIG. 13 after a third insertion step of the displacement body.
Figure 15:
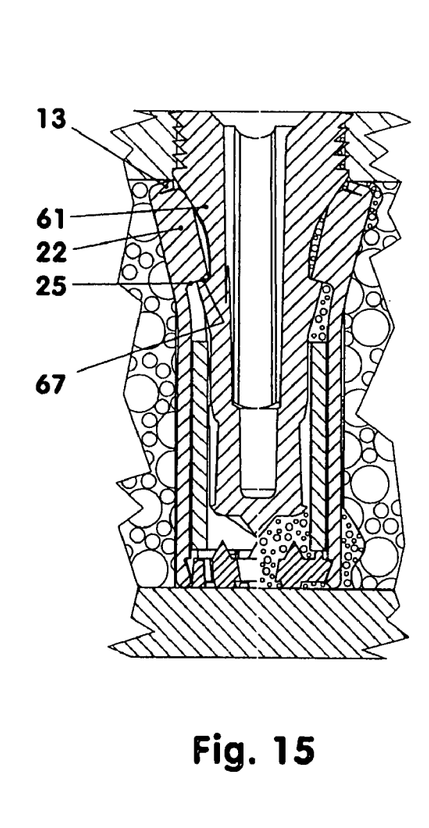
FIG. 15 is a view like FIG. 14 with the anchor turned by 45°.

This procedure is completed as soon as the displacement body 50 has reached its fourth and final position 91, see FIGS. 14 and 15. Then the lower part of the displacement body 5 occupies almost the complete inner space of the cement containment 40.

As shown in FIG. 15, the engagement elements 22 are spread apart to their maximum extent by the wedging zone 61. The pinnacles 13 abut almost completely the front face 12 and press from below against the inner surface 103 of the upper cover plate 101. At the same time, the engagement surfaces 25 of the engagement elements 22 are supported on the support surface 67 of the locking ring 66.

As shown in FIG. 14, the seal tongues 28 of the cylindrical body 10 below the wedging elements 62 are disposed on the support surface 67 and, there, prevent a backflow of the cement 8 into the lower areas of the anchor.

During the third step, the clamping zone 52 has been pressed into the bore 105. In the process, the circumferential webs 53 are engaged in the lower layers of the cover plate 101 whereas the upper areas of the clamping webs 55 are engaged in the normally harder surface layer of the cover plate 101. The respective base of the circumferential grooves 54 has here a smaller diameter than the bore 105, see FIG. 15. Via the vertical grooves 56, the cement 8 flows at least partially into the lower three circumferential grooves 54, see FIG. 15 so that also the clamping zone 52 is cemented to the upper cover plate 101.

Sometime thereafter, for example after 60 seconds, the cement 9 is cured.

The upper front face 21 of the clamping zone 52 is disposed in the exemplary embodiment in the plane of the outer cover plate surface 102. In praxis, the front face 57 is disposed generally one to two tenth of a millimeter below the outer cover plate surface 102.

In all shown cement anchors, it is possible to increase the length of the cylindrical body 10 and to have it project into a dead-end bore drilled into the lower cover plate 111, see DE 10 2006 049 954 A1(U.S. Ser. No. 12/386,571). The cartridge opening elements (73, 84, 151, 152) are pointed plastic parts of the displacement body 50 and of the bottom 140. Of course, such opening elements can also be formed by injected or inserted sharp-edged parts for example scalpel blades or similar devices.

| Listing of Reference Numerals | |
|---|---|
| 5 | Center line |
| 6 | Forward movement |
| 8 | Flowable cement |
| 9 | Cured cement |
| 10 | Cylindrical body |
| 11 | Tubular section |
| 12 | Upper front face |
| 13 | Pinnacles |
| 14 | Recesses |
| 16 | Opening |
| 17 | Inner space of cylinder body |
| 21 | Engagement area |
| 22 | Engagement element |
| 23 | Support surface |
| 24 | Channel |
| 25 | Engagement surfaces |
| 27 | Longitudinal slots |
| 28 | Elastic seal tongue |
| 31 | Second area |
| 32 | Hinge zone |
| 33 | Parallelipiped stops |
| 36 | Third area |
| 37 | Elastic tongues |
| 38 | Inclined groove |
| 39 | Longitudinal slots |
| 40 | Cement containment |
| 41 | Tube |
| 42 | Upper cover plate top side |
| 43 | Lower cover plate bottom side |
| 50 | Displacement body |
| 51 | Front face top |
| 52 | Clamping zone |
| 53 | Circumferential webs |
| 54 | Circumferential groove |
| 55 | Clamping webs |
| 56 | Vertical groove |
| 61 | Wedging zone |
| 62 | Wedging elements |
| 63 | Planar surface |
| 64 | Horizontal groove |
| 65 | Backflow zone |
| 66 | Locking ring |
| 67 | Support surface |
| 68 | Cannel-like cavities |
| 71 | Cylinder section |
| 72 | Rotation preventing webs |
| 73 | Engagement tips |

| -continued | |
|---|---|
| Listing of Reference Numerals | |
| 74 | Support projection |
| 75 | Lower engagement zone |
| 76 | Retaining surfaces |
| 77 | Blocking surfaces |
| 78 | Locking projections |
| 81 | Reflux channel |
| 82 | End of reflux channel |
| 83 | Lower front face |
| 84 | Pyramidal tip |
| 85 | Central opening |
| 86 | Radial webs |
| 87 | First position |
| 88 | Second position |
| 89 | Third position |
| 91 | Fourth position |
| 100 | Lightweight construction panel |
| 101 | Upper cover plate |
| 102 | Outer surface |
| 103 | Inner surface |
| 105 | Bore section |
| 111 | Lower cover plate |
| 113 | Inner surface |
| 121 | Support core |
| 125 | Bore section |
| 130 | Bore |
| 140 | Bottom |
| 141 | Outer wall |
| 142 | Trapezoidal cavity |
| 142 | Oval cavity |
| 144 | Top side |
| 147 | Break off pins |
| 148 | Break off webs |
| 149 | Support legs |
| 151 | Thorns |
| 152 | Sharp-edged prism |
| 155 | Bottom side |
| 156 | Legs |

What is claimed is:

1. An anchor for use in a bore (130) of a lightweight construction panel (100) including a support core (121) with upper and lower cover plates (101, 111) disposed on opposite sides of the support core (121), said anchor comprising a cylindrical body (10) provided with a bottom (140), a cement containment (40) and a displacement body (50) disposed in the cylindrical body (10), the cylindrical body (10) being provided with at least two engagement elements (22), which can be spread apart below the upper cover plate (101) by insertion of the displacement body (50) into the cylindrical body (10) via the bore (130), the cement containment (40) being disposed in an inner space (17) of the cylindrical body (10) which has several openings (16, 39, 142, 143), the cement containment (40) having fracturable top and bottom covers (42, 43), the bottom (140) of the cylindrical body (10) having opening elements (151, 152) directed toward the bottom cover (43) of the cement containment (40) and stops (147) projecting upwardly above the opening elements (151, 152) for temporarily supporting the cement containment (40), the displacement body (50) being disposed before insertion in the cylindrical body (10), above the cement containment (40) in a force-, form-, or material locking manner in a first position (87), the displacement body (50) having at its bottom side (83) opening elements (73, 84) directed toward the top cover (42) of the cement containment (40), the displacement body (50) during its advance movement (6), upon insertion into the cylinder body (10), reaching a second position (88) in which engagement projections (74) thereof abut the cement containment (40) after opening the top cover (42) of the cement containment (40) and a displacement of a partial amount of the cement (8) in a direction opposite the advance movement of the displacement body (50), the displacement body (150), upon further insertion into the cement containment (40), overcoming the support force of the bottom stops (147) and reaching a third position (89) in which the cement containment (40) is pressed onto the opening elements (151, 152) which rupture the bottom (43) of the cement containment (40), for the release of cement, the displacement body (50), upon overcoming the support force of the support projection (74) reaching a fourth, final, position (91) displacing a further partial amount of cement (8) via openings (39, 142, 143) into the cylinder bottom area in front of the lower cover plate (111) of the lightweight construction panel (100).

2. The anchor according to claim 1, wherein, in the fourth position (91), the upper front face (51) of the displacement body (50) is at least essentially flush with the outer surface (102) of the upper cover plate (101).

3. The anchor according to claim 1, wherein the cylindrical body (10) consists of a tubular section (11) and a bottom (140).

4. The anchor according to claim 1, wherein the cement containment (40) comprises a tube (41) which is closed at its front ends by a gas and liquid-tight cover (42, 43).

5. The anchor according to claim 4, wherein the gas and liquid-tight covers (42, 43) have a fracture resistance of less than 10 N/mm².

6. The anchor according to claim 1, wherein, in the state of the anchor as it is commercially available, the cement containment (40) is positioned in the inner space (17) of the cylindrical body (10) between the steps (33) and the break-off pins (147).

7. The anchor according to claim 1, wherein the cement containment (40) is filled with a cyanoacrylate cement (8, 9).

8. The anchor according to claim 1, wherein the displacement body (50) includes a locking ring (66) which extends at least partially around the displacement body (50) and which has a support surface (67) for supporting and locking the engagement elements (22) of the cylindrical body (10) in the fourth position (91) of the displacement body (50).

9. The anchor according to claim 1, wherein, for accommodating a mounting element (80), the displacement body (50) has a central opening (85) which is at least partially frustroconical and in which at least three radially inwardly projecting webs 86 are arranged.

* * * * *